Figure 1:
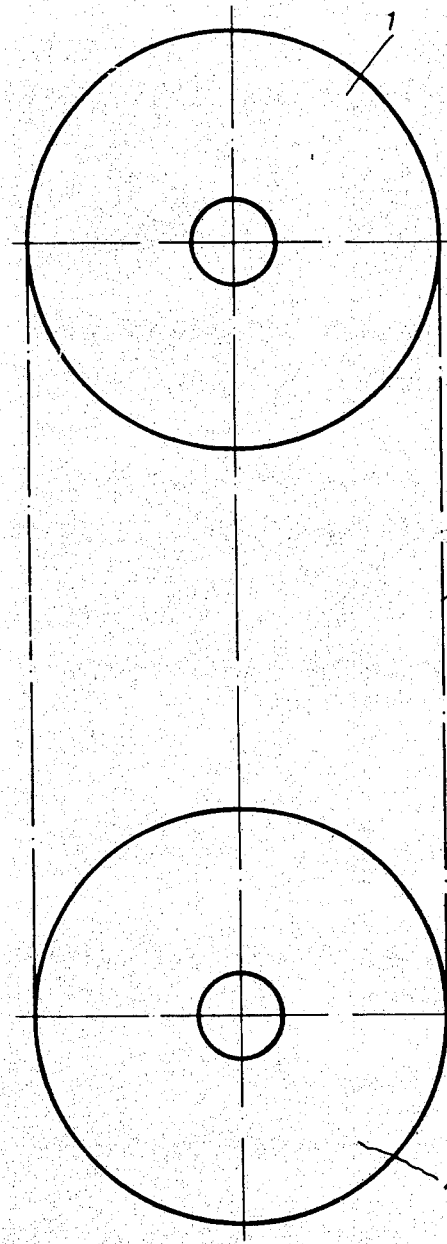

United States Patent [19]

Sidler

[11] 4,341,138

[45] Jul. 27, 1982

[54] BAND SAW

[75] Inventor: Kurt Sidler, Ottenbach, Switzerland

[73] Assignee: Gottlieb Johner, Kerzers, Switzerland

[21] Appl. No.: 125,816

[22] Filed: Feb. 29, 1980

[30] Foreign Application Priority Data

Mar. 2, 1979 [CH] Switzerland .................. 2076/79

[51] Int. Cl.³ .................. B23D 55/08; B27B 13/10
[52] U.S. Cl. .................. 83/820; 83/788; 83/523
[58] Field of Search .................. 83/820, 788, 523

[56] References Cited

U.S. PATENT DOCUMENTS 2,865,412 12/1958 Crane .................. 83/523
4,128,031 12/1978 Sato .................. 83/820

FOREIGN PATENT DOCUMENTS 9024 9/1894 Switzerland .................. 83/788
4264 of 1898 United Kingdom .................. 83/788

Primary Examiner—Donald R. Schran
Attorney, Agent, or Firm—Townsend and Townsend

[57] ABSTRACT

The band saw comprises two wheels spaced from each other and mounted for rotation on a support. A saw blade is trained under tension about the wheels, one of which is a power driven wheel. The bearing surfaces of both the wheels are provided with grooves which are closed upon themselves and run parallel to one another and to the rims of the wheels. The individual grooves on the one wheel are aligned with the respective opposite grooves on the other wheel in such a way that the planes running through the same are parallel to one another. The grooves, especially at least those two grooves lying opposite to each other on the one and the other wheel in the direction towards the teething of the saw blade and having the same width and the same depth, provide for an excellent bearing and guiding of the saw blade trained about the wheels. The saw blade need not to be aligned, stretched or levelled during the operation.

2 Claims, 2 Drawing Figures

BAND SAW

This invention relates to a band saw comprising a support, two wheels mounted for rotation on the support on spaced axes, one of said wheels being power driven, and a saw blade in the form of an endless saw band trained under tension around the wheels and provided with teeth, the bearing surfaces of both the wheels having grooves running parallel to one another and the rims of said wheels.

Band saws of this kind are used for sawing e.g. trunks of trees having a large diameter, especially for sawing hard tropical round timbers having a diameter of more than 40 cm. The saw blade of the band saw consists of an endless band made of an alloy steel which is endlessly soldered or welded. The saw blade is trained in a vertical or a horizontal plane about two cast iron wheels spaced from each other. The wheels are mounted for rotation on a support, whereby the one of the wheels is power driven. The profile of the wheels or at least the profile of the power driven wheels is usually outwardly curved, it means that the bearing surfaces of the wheel or the wheels have a convex profile. On such a wheel or wheels having a convex profile the saw blade is well held even at a high rotational speed of the wheels and can react against the pressure of the material, such as wood or plastics of any size. However, after a certain working time the saw blade has to be removed from the wheels and aligned, stretched and levelled, because it has no more the properties required for an efficient sawing. The operations to be done in this connection are time consuming and have to be carried out by an expert personnel.

There are known from the Swiss Patent Specification No. 9024 band saw wheels having instead of a smooth mantel several grooves provided thereon. However, such grooves do not serve either for a precise guiding of the saw blade trained about the wheels or for preventing its deformation during the operation, but for forming rings which—depending on the wear and the thereby brought about smaller width of the saw blade—offer supports for the one or both rows of teeth of the saw blade trained about the wheels. In this way the damage of the teeth set is prevented. For this purpose the rings as well as the grooves have different widths.

It is an object of the invention to provide a band saw of the above mentioned kind the wheels of which—whether outwardly curved or not—are constructed in such a way that the saw blade is trained and guided precisely and without deformation on the wheels, especially those in the zone of the wheel teeth, so that the saw blade has not to be removed from the wheels after a certain working time and to be set in order as it was the case up to now. In this way such a band saw should achieve a higher performance and the costs of the sawing operation should be reduced.

With the above object in view, this invention resides in the novel construction of the wheels of the above mentioned band saw, wherein the width and depth of at least two grooves lying opposite each other on the one and the other wheel are equal in order to precisely guide the saw blade trained about such wheels.

The accompanying drawing illustrates by way of example the inventive construction of the band saw.

Figure 2:
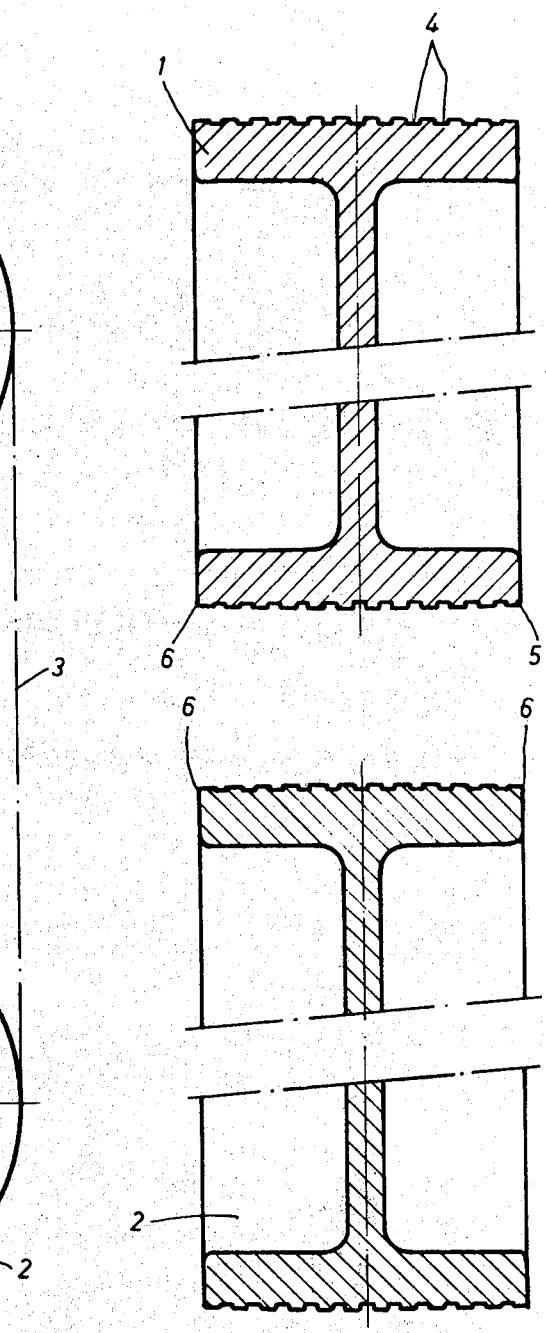

FIG. 1 shows a schematic elevational view of two band saw wheels spaced vertically from each other, whereby a saw blade is trained under tension about the wheels, and FIG. 2 shows a section of both the wheels according to FIG. 1 on a larger scale.

On a not shown support made of cast iron or welded together from steel pieces there are mounted two band saw wheels 1, 2 for rotation on vertically spaced axes. In this case the band saw is a vertical band saw. The axes of both the wheels can, however, be spaced from each other horizontally. The wheels 1, 2 can be shifted with regard to each other in order to adjust the distance between them as required. A saw blade 3 is trained under tension about the wheels 1, 2. It has the form of an endless band with teething. The saw blade 3 is made of alloy steel in which teeth have been punched on one of its edges. The cutting speed of the saw blade which is driven through frictional engagement between one face of the blade 3 and the periphery of the driven wheel 1 is given by the rotational speed of this power driven wheel 1. The not shown timber to be cut is forwarded in the cutting on a not shown timber carriage.

As it can be seen from FIG. 2 the bearing surfaces 5 of both the wheels 1 and 2 about which the saw blade 3 is trained are provided with grooves 4. The grooves 4 extend over the whole circumferential face of each wheel 1, 2 and are closed upon themselves; they run parallel to one another and parallel to the rims 6 of the wheels 1, 2. The individual grooves 4 on the one wheel are aligned with the respective opposite grooves 4 on the other wheel in such a way that the planes running through the same are parallel to one another. The wheels 1, 2 can, however, be slightly inclined to each other so that the grooves 4 on the one wheel do not run parallel with the respective opposite grooves on the other wheel.

The grooves 4 on both the wheels 1, 2 have generally a U-profile. It is, however, also possible that the profile of the grooves is differently shaped. The width of the grooves 4 makes at least 3 mm and their depths at least 0,2 mm. Thereby the width and the depth of at least two grooves 4 on the one wheel and the other wheel 1, 2 lying opposite to each other are the same.

The grooves 4 are turned, milled or ground in the bearing surfaces 5 of the wheels 1, 2. It would also be possible to make the grooves in another way; so the grooves could be produced by sticking a grooved plastic foil on the bearing surfaces 5.

The grooves 4, especially at least those two grooves the width and the depth of which are equal, provide for an excellent bearing and guiding of the saw blade 3 trained about the wheels 1, 2. It is assumed that the material of the saw blade 3 is partially pressed into the grooves 4 after it has been run in for approximately 20 minutes. When using the wheels provided with the grooves, there is no need for a subsequent setting in order of the saw blade. The saw blade will be used up to its minimal usefull width during the operation without necessarily removing it from the wheels (with the exception of the sharpening of the teeth). It is most advantageous that the saw blade need not be at all aligned, stretched or levelled during the operation. In this way the up to now usual frequent exchange and setting in order of the saw blade is eliminated and the production is substantially increased.

What I claim is:

1. A band saw comprising a support, two cast iron wheels mounted for rotation on the support on spaced axes, one of said wheels being power driven, and a saw blade in the form of an endless saw band trained under tension around the wheels and provided with teeth, the bearing surfaces of both the wheels having a large number of grooves running parallel to one another and the rims of said wheels, the width of the grooves exceeding the depth, wherein the width and depth of at least two grooves lying opposite each other on the one and the other wheel are equal so that zones of the saw band running over the grooves of the first wheel are running over the grooves having the same dimensions of the second wheel.

2. The band saw of claim 1, wherein the grooves have a width of at least 3 mm and a depth of at least 0,2 mm.

* * * * *